(12) United States Patent
Kim

(10) Patent No.: US 8,333,267 B2
(45) Date of Patent: Dec. 18, 2012

(54) VEHICLE DISK BRAKE

(75) Inventor: Joo Gon Kim, Gyeonggi-do (KR)

(73) Assignee: Mando Corporation, Gyeonggi-Do (KR)

( * ) Notice: Subject to any disclaimer, the term of this patent is extended or adjusted under 35 U.S.C. 154(b) by 353 days.

(21) Appl. No.: 12/389,160

(22) Filed: Feb. 19, 2009

(65) Prior Publication Data

US 2009/0223754 A1    Sep. 10, 2009

(30) Foreign Application Priority Data

Mar. 7, 2008    (KR) ........................ 10-2008-0021359

(51) Int. Cl.
*F16D 55/08*    (2006.01)
*F16D 65/14*    (2006.01)

(52) U.S. Cl. .................... 188/72.7; 188/196 M; 188/216

(58) Field of Classification Search ........ 188/72.1–72.7, 188/196 M, 196 V, 216, 70 R
See application file for complete search history.

(56) References Cited

U.S. PATENT DOCUMENTS

| | | | | |
|---|---|---|---|---|
| 3,430,736 A | * | 3/1969 | Long | 188/72.7 |
| 3,662,864 A | * | 5/1972 | Evans | 188/72.2 |
| 3,869,024 A | * | 3/1975 | Hauth et al. | 188/72.5 |
| 6,978,868 B2 | * | 12/2005 | Schautt | 188/72.7 |
| 7,143,873 B2 | * | 12/2006 | Pascucci et al. | 188/72.7 |
| 2005/0077782 A1 | | 4/2005 | Horiuchi et al. | |

FOREIGN PATENT DOCUMENTS

| | | |
|---|---|---|
| DE | 1 873 669 U | 6/1963 |
| DE | 102 18 825 A1 | 11/2003 |
| DE | 10 2006 033 569 A1 | 2/2007 |
| DE | 10 2005 049 785 B3 | 5/2007 |
| DE | 10 2005 055 445 | 5/2007 |
| DE | 10 2006 028 671 A1 | 12/2007 |
| DE | 10 2006 030 565 A1 | 1/2008 |
| KR | 10-2006-0068318 A | 6/2006 |

OTHER PUBLICATIONS

Chinese Office Action issued in Chinese Patent Application No. 200910004658.9, mailed Jan. 25, 2011.
German Office Action issued in German Patent Application No. 10 2009 009 717.1-12 dated Apr. 23, 2010.

* cited by examiner

*Primary Examiner* — Bradley King
*Assistant Examiner* — Vishal Sahni
(74) *Attorney, Agent, or Firm* — McDermott Will & Emery LLP

(57) ABSTRACT

Disclosed is a disk brake for a vehicle having a manual release unit, capable of manually releasing the contact of a disk and a friction pad which are locked in a braking state. The disk brake includes a disk rotating together with a wheel of the vehicle, a friction pad which makes contact with a side surface of the disk to generate braking force, a wedge member to which the friction pad is attached, a drive motor which generates driving force to move the wedge member in a direction of the disk, a power transmission part which sifts rotational motion of the drive motor into a linear motion of the wedge member, a pad compensation part which maintains a uniform gap between the friction pad and the disk, and a manual release part installed in the pad compensation part such that contact between the friction pad and the disk is manually released when the friction pad and the disk are locked in a braking state due to friction between the friction pad and the disk.

10 Claims, 4 Drawing Sheets

VEHICLE DISK BRAKE

CROSS-REFERENCE TO RELATED APPLICATIONS

This application claims the benefit of Korean Patent Application No. 10-2008-0021359, filed on Mar. 7, 2008, in the Korean Intellectual Property Office, the disclosure of which is incorporated herein by reference.

BACKGROUND OF THE INVENTION

1. Field of the Invention

The present invention relates to a vehicle disk brake. More particularly, the present invention relates to a vehicle disk brake provided with a manual release unit capable of manually releasing contact between a disk and a friction pad, which are locked in a braking state of the vehicle.

2. Description of the Prior Art

In general, a vehicle disk brake produces braking force by partially pressing a disk from both sides of the disk that rotates together with a wheel, by using friction pads. Such a vehicle disk brake comprises a disk rotating together with a wheel of the vehicle, friction pads that generate braking force through contact with one side of the disk, a wedge member provided at one side thereof with the friction pads and moved toward the disk by a driving motor that generates force, and a guide member that guides the wedge member toward the disk. Thus, the wedge member is sandwiched between the disk and the guide member due to frictional force generated between the friction pads and the disk, so that great braking force can be obtained.

The conventional disk brake further comprises a power transmission member capable of moving the wedge member toward the disk being rotated while rotating by the driving motor. In order to move the power transmission member toward the disk being rotated, a male screw is formed in a rotating shaft of the driving motor and a shaft hole having a female screw is formed through the power transmission member, so that the power transmission member can move toward the disk according to a rotation direction of the rotating shaft.

Further, in order to perform a braking operation, the disk brake employs a booster that reduces speed of the disk by using rotational force of the driving motor, and reduces displacement of the disk brake to perform a boosting operation. The disk brake may use a pair of wedge members, which have inclination surfaces corresponding to each other, as the booster. As the wedge members move reciprocate, the friction pads make contact with the disk or the friction pads are spaced apart from the disk, so that the braking operation can be performed.

However, in the conventional vehicle disk brake, if the disk and the friction pads are locked while making contact with each other due to malfunction of a motor or power failure, the contact between the disk and the friction pads may not be released.

SUMMARY OF THE INVENTION

Accordingly, it is an aspect of the present invention to provide a disk brake for a vehicle having a manual release unit, capable of manually releasing a contact between a disk and a friction pad that are locked in a braking state.

Additional aspects and/or advantages of the invention will be set forth in part in the description which follows and, in part, will be apparent from the description, or may be learned by practice of the invention.

The foregoing and and/or other aspects of the present invention are achieved by providing a disk brake for a vehicle, which includes a disk rotating together with a wheel of the vehicle, a friction pad which makes contact with a side surface of the disk to generate braking force, a wedge member to which the friction pad is attached, a drive motor which generates driving force to move the wedge member toward the disk, a power transmission part which shifts rotational motion of the drive motor into a linear motion of the wedge member, a pad compensation part which maintains a uniform gap between the friction pad and the disk, and a manual release part installed in the pad compensation part such that contact between the friction pad and the disk is manually released when the friction pad and the disk are locked in a braking state due to friction between the friction pad and the disk.

In addition, the manual release part includes a stem part formed therein with a fixing groove through which the manual release part is fixed to the pad compensation part and a head part configured easily rotated, and the pad compensation part is provided with a protrusion corresponding to the fixing groove.

In addition, the pad compensation part includes a detection part which detects a gap between the disk and the wedge member moved due to abrasion of the friction pad, a motor which generates power to compensate for the gap detected by the detection part, a worm screw which transfers rotational motion of the motor, a worm gear engaged with the worm screw and formed therein with a first screw part; and a second screw part formed on an outer surface of the drive motor to correspond to the first screw part of the worm gear.

In addition, the manual release part is coupled with the motor of the pad compensation part.

In addition, the manual release part is coupled with one of the worm gear, the worm screw, and the wedge member.

As described above, according to the present invention, the contact between the disk and friction pad which are locked due to electrical on/off or malfunction in a braking state can be manually released.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
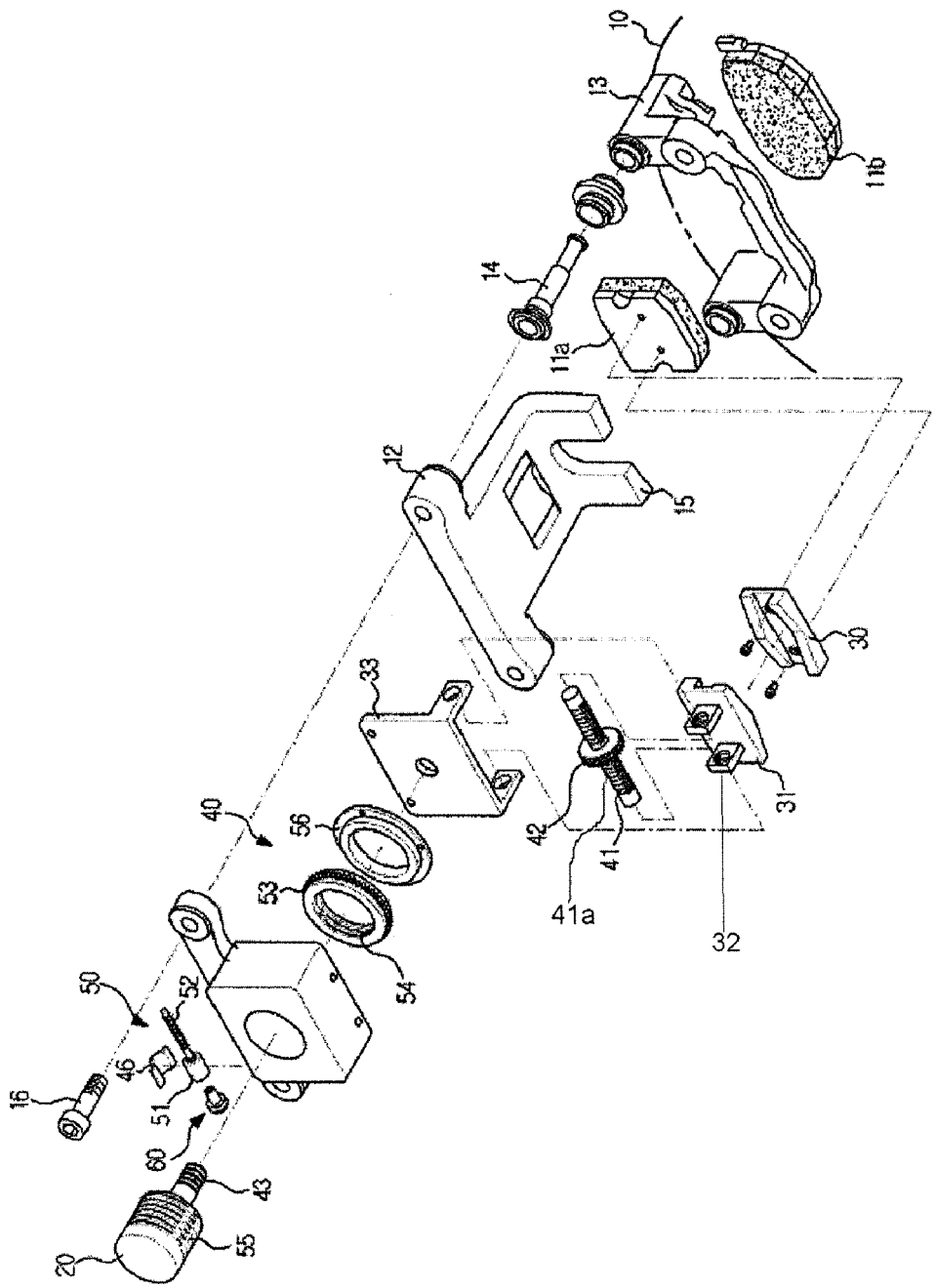
FIG. 1 is an exploded perspective view schematically representing a disk brake for a vehicle according to the present invention.
Figure 2:
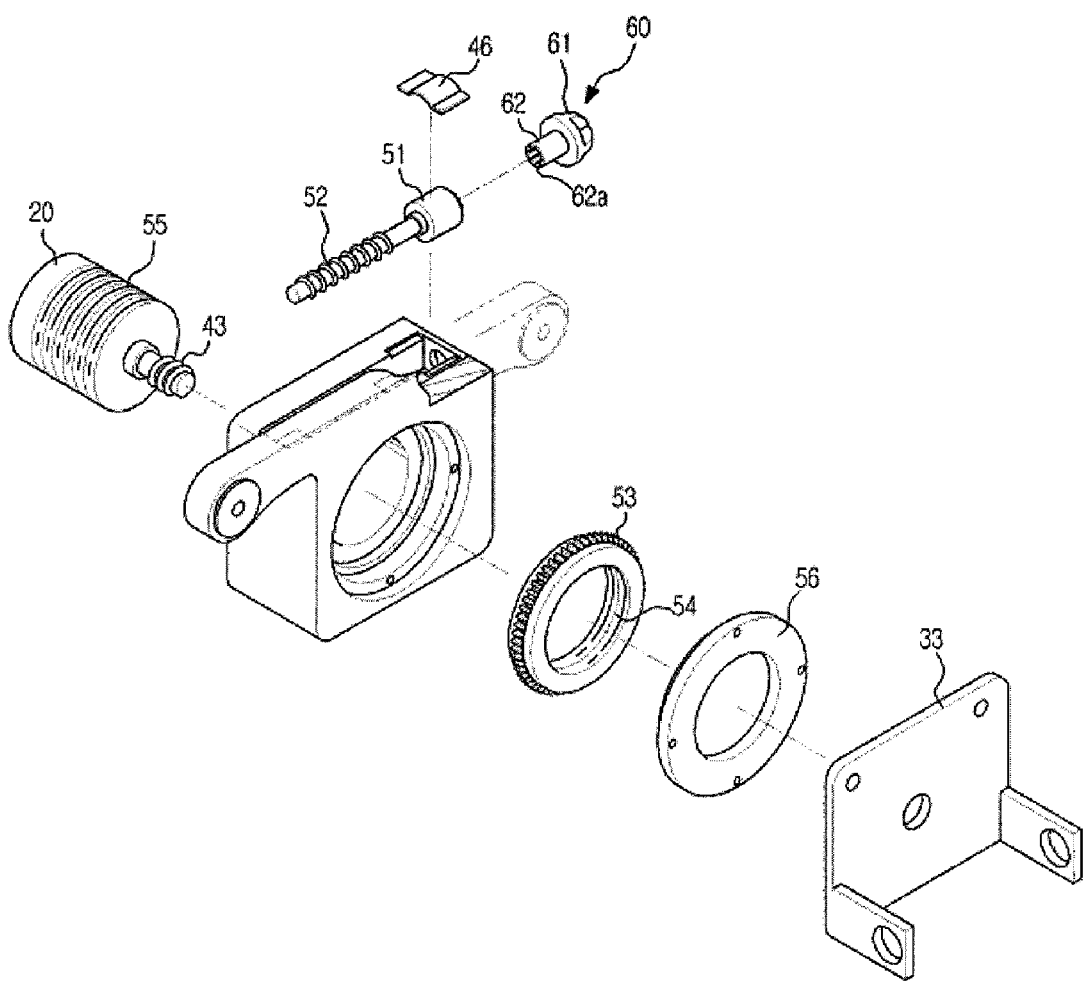
FIG. 2 is an exploded perspective view schematically representing a pad compensation part and a manual release unit of the disk brake for the vehicle according to the present invention.
Figure 3:
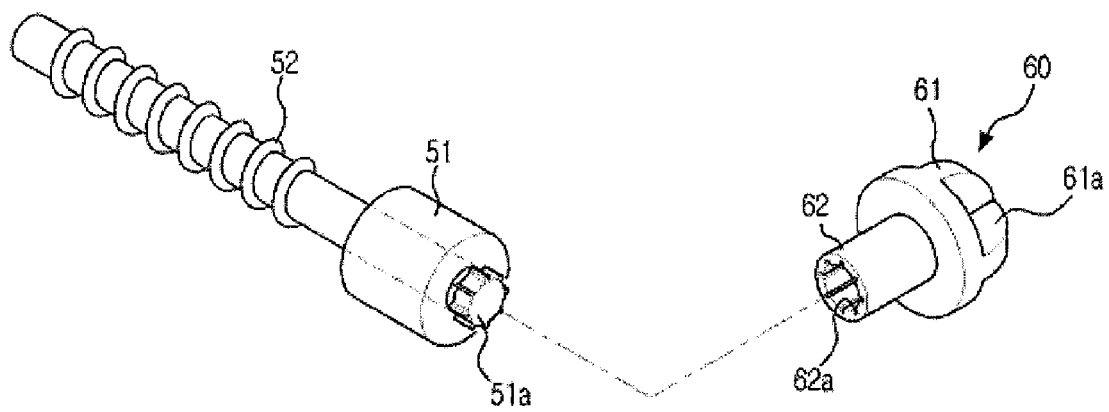
FIG. 3 is an exploded perspective view schematically representing the manual release unit according to the present invention.
Figure 4:
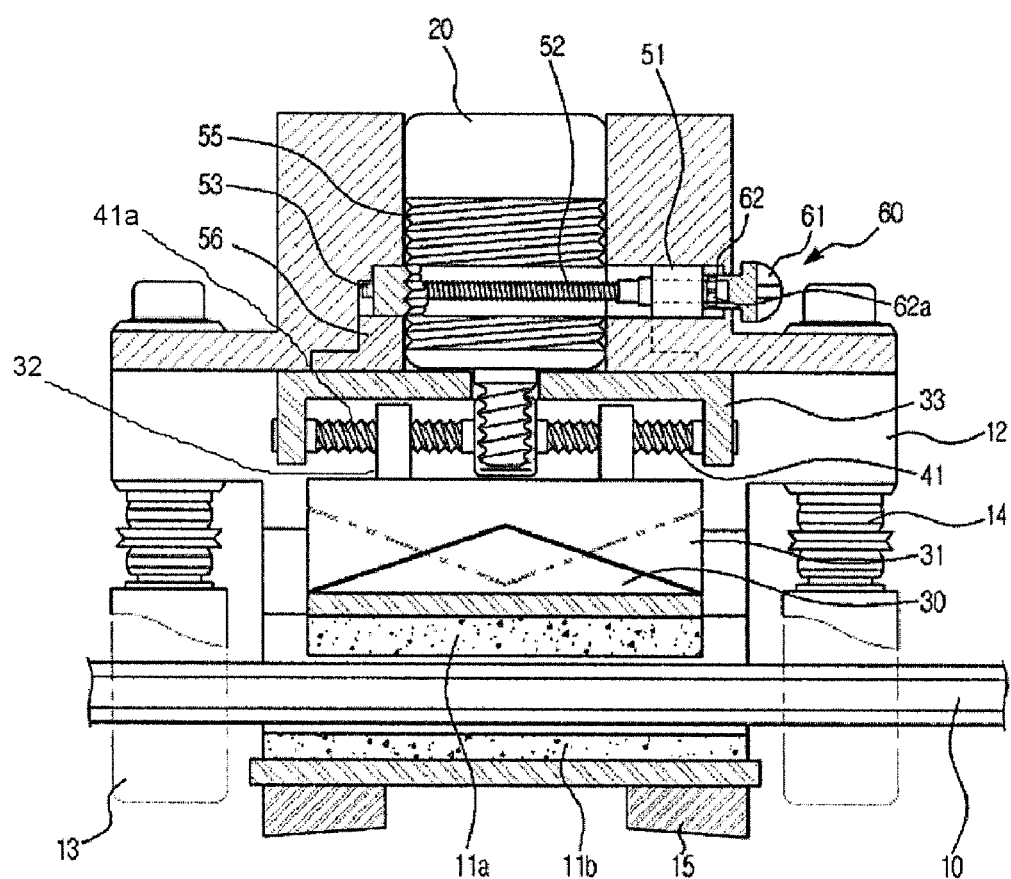
FIG. 4 is a sectional view schematically representing the manual release unit according to the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

As shown in drawings, a disk brake for a vehicle according to the present invention is used to obtain braking force by allowing friction pads 11a and 11b to make contact with both sides of a disk 10, which has a disk shape and rotates together with a wheel (not shown) of the vehicle, respectively.

The disk brake includes a caliper housing 12, which has the pair of friction pads 11a and 11b attached to both inner sides of the caliper housing 12 in opposition to each other, and a carrier 13, which is fixed to the vehicle to allow the caliper housing 12 to move back and forth.

In order to allow the caliper housing 12 to move back and forth with respect to the carrier 13, a pair of guide rods 14, which move back and forth with respect to the carrier 13, are fixed to both ends of the caliper housing 12 through a coupling member such as a screw 16.

A wedge member 30 equipped with the friction pad 11a is provided at one side of an inner surface of the caliper housing 12. The friction pad 11a is installed at a front surface of the wedge member 30 facing the disk 10, and a guide member 31 is disposed at a rear surface of the wedge member 30. The guide member 31 directly/indirectly makes contact with the rear surface of the wedge member 30 and receives power from a drive motor 20 to perform a linear motion such that the wedge member 30 advances towards the disk 10.

In addition, a finger part 15 is provided at the other side of the inner surface of the caliper housing 12 to install the friction pad 11b.

According to the present invention, one of the two friction pads 11a and 11b installed on the wedge member 30 and moving together with the wedge member 30 is referred to as a movable friction pad 11a, and the remaining friction pad installed in the finger part 15 in opposition to the movable friction pad 11a is referred to as a fixed friction pad 11b.

The wedge member 30 is disposed in parallel to one surface of the disk 10 such that the movable friction pad 11a uniformly makes contact with the surface of the disk 10 as a whole. The rear surface of the wedge member 30 is inclined with respect to the disk 10 at a predetermined angle such that one of both side ends of the wedge member 30 disposed at a side of the disk 10 has a wedge shape.

The guide member 31 has a front surface inclined corresponding to the rear surface of the wedge member 30 to guide the wedge member 30 toward the disk 10 when the wedge member 30 moves toward the disk 10.

In addition, a power transmission part 40 is provided between the guide member 31 and the drive motor 20 to convert the rotational force of the drive motor 20 into a linear motion of the wedge member 30.

The power transmission part 40 includes a worm 43 engaged with a rotary shaft of the drive motor 20, a worm wheel 42 driven according to the rotation of the worm 43, a spindle 41, which passes through the center of the worm wheel 42 to rotate together with the worm wheel 42 and is formed at an outer surface thereof with a screw 41a, and a transfer member 32, which moves back and forth along the screw 41a of the spindle 41 in an axial direction of the spindle 41 and is connected to the guide member 31.

The spindle 41 is supported by a fixed member 33 provided between the power transmission part 40 and the movable friction pad 11a.

The transfer member 32 can be realized as a nut (not shown) or a ball screw (not shown) to perform a linear motion according to the rotation of the spindle 41. In this case, the guide member 31 is slidably coupled with the wedge member 30 such that the wedge member 30 slantingly moves when the transfer member 32 moves in the axial direction of the spindle 41.

When the power generated by rotational force of the drive motor 20 is transferred to the worm 43 and the worm wheel 42 and thus the transfer member 32 moves in the axial direction of the spindle 41, the rear surface of the wedge member 30 is guided into the front surface of the guide member 31 so that the wedge member 30 moves toward the disk 10. Therefore, the movable friction pad 11a installed on the wedge member 30 presses one side of the disk 10 to produce friction, thereby generating braking force.

In addition, the caliper housing 12 moves backward by repulsive force generated when the movable friction pad 11a presses the disk 10, so the fixed friction pad 11b installed on the caliper housing 12 is pressed against the other side of the disk 10 to produce friction, thereby generating braking force.

Further, in a state in which the movable friction pad 11a presses the disk 10, friction between the movable friction pad 11a and the disk 10 allows the wedge member 30 to be sandwiched between a front surface of the guide member 31 and one side of the disk 10, so that great breaking force can be obtained with small amount of power.

The rear surface of the wedge member 30 is inclined such that two side ends of the rear surface are laterally symmetrical to each other about the center of the rear surface, so that both side ends of the wedge member 30 may form a wedge shape. In addition, a central part of the front surface of the guide member 31 is recessed such that both sides of the guide member 31 are inclined corresponding to the rear surface of the wedge member 30, respectively, so that the guide member 31 can be applied to both of the left and right wheels.

Meanwhile, when the braking operation is released, the rotary shaft of the drive motor 20 reversely rotates, so the transfer member 32 returns to its original position while performing a linear motion in parallel to the screw 41a of the spindle 41. As a result, the movable friction pad 11a is separated from the disk 10, so that the braking state is released.

The above braking process causes abrasion of the friction pad 11a, so a pad compensation part 50 is installed to compensate for the reduced thickness of the friction pad 11a.

The pad compensation part 50 includes a detection part 46, which detects the approach of the wedge member 30 equipped with the movable friction pad 11a to the disk 10 caused by the abrasion of the friction pads 11a and 11b, a driving part, that is, a motor 51 to generate driving force by interacting with the detection part 46, a worm screw 52, a worm gear 53, a first screw part 54 and a second screw part 55.

In the braking process, if the wedge member 30 moves toward the disk 10 by a predetermined distance or above, the detection part 46 allows the drive motor 20 to linearly move, so that the wedge member 30 connected to the drive motor 20 and the friction pad 11a also make a linear motion, thereby compensating for a gap formed between the friction pad 11a and the disk 10 due to the abrasion of the friction pad 11a.

If the motor 51 serving as a driving part of the pad compensation part 50 rotates, the worm screw 52 connected to the motor 51 also rotates.

Thus, the worm screw 52 perpendicularly makes contact with the worm gear 53 connected to the worm screw 52. As the rotational motion of the motor 51 is transferred to the worm gear 53, the motor 51 is decelerated, but the braking force is increased.

The first screw part 54 is formed on an inner surface of the worm gear 53, and the second screw part 55 is formed on an outer surface of the drive motor 20 to make contact with the first screw part 54 of the worm gear 53. As the worm gear 53 rotates due to the driving force of the motor 51, the drive motor 20 makes a linear motion by the second screw part 55, which is formed on the outer surface of the drive motor 20, and the first screw part 54 of the worm gear 53 corresponding to the first screw part 55.

Such a linear motion compensates for the gap caused by the abrasion of the friction pads 11*a* and 11*b* during the braking process.

In addition, a manual release unit 60 is installed on the pad compensation part 50 to enable a user to manually release the disk brake, which has been locked due to electrical on/off or malfunction in the braking state in which the friction pads 11*a* and 11*b* make contact with the disk 10.

The manual release unit 60 according to the present embodiment includes a stem part 62 and a head part 61.

The stem part 62 has a cylindrical shape and is connected to the pad compensation part 50. The stem part 62 has an inner surface formed with a fixing groove 62*a*.

A fixing protrusion 51*a* extends from the outer surface of a rotary shaft of the motor 51 such that the manual release unit 60 is installed on the motor 51 of the pad compensation part 50.

That is, the fixing protrusion 51*a* of the pad compensation part 50 is press-fitted into the fixing groove 62*a* of the stem part 62.

The head part 61 is formed opposite to the stem part 62 and includes a plurality of rotation ribs 61*a* which allow a user to easily rotate the stem part 62. The rotation ribs 61*a* serve as a support such that the user easily rotates the manual release unit 60 using hands or feet.

If the disk 10 and the friction pad 11*a* are locked due to power failure or malfunction in the braking state, the user rotates the head part 61 of the manual release unit 60, so that the motor 51 of the pad compensation part 50 is rotated.

As the motor 51 rotates, the worm screw 52 connected to the motor 51 rotates, and thus the rotating worm screw 52 perpendicularly makes contact with the worm gear 53 connected to the worm screw 52. As a result, the rotational motion of the motor 51 is transferred to the worm gear 53.

The first screw part 54 formed on the inner surface of the worm gear 53 moves along the second screw part 55 formed on the outer surface of the drive motor 20, leading to a linear motion of the friction pad 11*a*, so that the locking state of the friction pad 11*a* and the disk 10 is released.

Although the manual release unit 60 according to the present embodiment is connected to the motor 51 of the pad compensation part 50, the present invention is not limited thereto. According to another embodiment, the manual release unit 60 can be connected to one of the worm gear 53, the worm screw 52 and the wedge member 30.

Although not shown in the drawings, for example, a fixing protrusion protruding from a side of the wedge member 30 can be fixed to the fixing groove 62*a* of the stem part 60. In this case, when the user manually rotates the head part 61, the wedge member 30 moves upward and thus the friction pad 11*a* making contact with the disk 10 moves upward by the wedge member 30, thereby releasing the braking state between the disk 10 and the friction pad 11*a*.

Although few embodiments of the present invention have been shown and described, it would be appreciated by those skilled in the art that changes may be made in these embodiments without departing from the principles and sprit of the invention, the scope of which is defined in the claims and their equivalents.

What is claimed is:

1. A disk brake for a vehicle, the disk brake comprising:
   a disk rotating together with a wheel of the vehicle;
   a friction pad which makes contact with a side surface of the disk to generate braking force;
   a wedge member to which the friction pad is attached;
   a drive motor which generates a driving force to move the wedge member toward the disk, said drive motor includes an axis about which rotational motion is provided;
   a power transmission part which shifts the rotational motion of the drive motor into a linear motion of the wedge member;
   a pad compensation part mechanically coupled to said drive motor, said pad compensation part maintains a gap between the friction pad and the disk uniform by displacing said drive motor; and
   a manual release part installed in the pad compensation part such that contact between the friction pad and the disk is manually released when the friction pad and the disk are locked in a braking state due to friction between the friction pad and the disk,
   wherein said pad compensation part includes a driving part which displaces said drive motor relative to said driving part in a direction parallel to said axis.

2. The disk brake of claim 1, wherein the manual release part includes a stem part formed therein with a fixing groove through which the manual release part is fixed to the pad compensation part and a head part configured to be rotated, and the pad compensation part is provided with a fixing protrusion corresponding to the fixing groove.

3. The disk brake of claim 1, wherein the pad compensation part includes: a detection part which detects the gap between the disk and the wedge member moved due to abrasion of the friction pad;
   said driving part includes a compensation motor which generates power to compensate for the gap detected by the detection part;
   a worm screw which transfers rotational motion of the compensation motor;
   a worm gear engaged with the worm screw and formed therein with a first screw part; and
   a second screw part formed on an outer surface of the drive motor to correspond to the first screw part of the worm gear.

4. The disk brake of claim 3, wherein the manual release part is coupled with the compensation motor.

5. The disk brake of claim 3, wherein the manual release part is coupled with one of the worm gear, the worm screw, and the wedge member.

6. The disk brake of claim 1, wherein the driving part includes a member configured to rotate about said axis.

7. The disk brake of claim 1, wherein the driving part includes a member configured to rotate about said drive motor.

8. The disk brake of claim 7, wherein the member includes a first screw part, and a second screw part is formed on an outer surface of the drive motor to correspond to the first screw part.

9. The disk brake of claim 3, wherein the worm gear is configured to rotate about said axis.

10. The disk brake of claim 3, wherein the worm gear is configured to rotate about said drive motor.

* * * * *